United States Patent
Bae et al.

(10) Patent No.: US 10,719,942 B2
(45) Date of Patent: Jul. 21, 2020

(54) REAL-TIME IMAGE PROCESSING SYSTEM AND METHOD

(71) Applicant: HANWHA DEFENSE CO., LTD., Changwon-si (KR)

(72) Inventors: Ju Han Bae, Changwon-si (KR); Ki Seok Kim, Changwon-si (KR); Jae Hyuk Ju, Changwon-si (KR)

(73) Assignee: HANWHA DEFENSE CO., LTD., Changwon-si (KR)

( * ) Notice: Subject to any disclaimer, the term of this patent is extended or adjusted under 35 U.S.C. 154(b) by 158 days.

(21) Appl. No.: 15/841,965

(22) Filed: Dec. 14, 2017

(65) Prior Publication Data

US 2019/0019298 A1    Jan. 17, 2019

(30) Foreign Application Priority Data

Jul. 31, 2017    (KR) .................. 10-2017-0089166

(51) Int. Cl.
   *G06T 7/246*     (2017.01)
   *G06K 9/00*      (2006.01)
   *G06K 9/48*      (2006.01)
   *G06T 7/215*     (2017.01)

(52) U.S. Cl.
   CPC .......... *G06T 7/246* (2017.01); *G06K 9/00335* (2013.01); *G06K 9/481* (2013.01); *G06T 7/215* (2017.01); *G06T 2207/20021* (2013.01); *G06T 2207/20182* (2013.01); *G06T 2207/30252* (2013.01)

(58) Field of Classification Search
   None
   See application file for complete search history.

(56) References Cited

U.S. PATENT DOCUMENTS

| | | | |
|---|---|---|---|
| 8,711,941 B2 * | 4/2014 | Letunovskiy | H04N 19/56 375/240.16 |
| 2004/0239552 A1 | 12/2004 | Chon et al. | |
| 2009/0169059 A1 * | 7/2009 | Kleinjohann | H04N 5/144 382/107 |
| 2009/0220173 A1 * | 9/2009 | Wajs | G06T 7/223 382/284 |

(Continued)

FOREIGN PATENT DOCUMENTS

| | | |
|---|---|---|
| JP | 2014-38611 A | 2/2014 |
| KR | 1020040103287 A | 12/2004 |

(Continued)

OTHER PUBLICATIONS

Shuaicheng Liu, et al; "MeshFlow: Minimum Latency Online Video Stabilization", European Conference on Computer Vision ECCV 2016: Computer Vision-ECCV 2016; pp. 800-815; First Online Sep. 17, 2016.

*Primary Examiner* — Leon Viet Q Nguyen
(74) *Attorney, Agent, or Firm* — Sughrue Mion, PLLC

(57) ABSTRACT

Provided are an image processing system and an image processing method. An image processing method includes: constructing a plurality of grids on an image; extracting features of the image; estimating a grid motion vector of each of the plurality of grids, based on a first motion vector of each of the features; estimating a second motion vector of each feature based on the grid motion vector; and detecting a moving object based on a difference between the first motion vector and the second motion vector.

18 Claims, 13 Drawing Sheets

(56) References Cited

U.S. PATENT DOCUMENTS

2010/0271011 A1  10/2010  Shimizu
2014/0049644 A1   2/2014  Deigmoeller et al.

FOREIGN PATENT DOCUMENTS

| KR | 1020100117506 A | 11/2010 |
| KR |  101460317 B1   | 11/2014 |
| KR | 1020140119989 A | 11/2014 |

* cited by examiner

REAL-TIME IMAGE PROCESSING SYSTEM AND METHOD

CROSS-REFERENCE TO RELATED APPLICATION

This application claims the benefit of Korean Patent Application No. 10-2017-0089166, filed on Jul. 13, 2017, in the Korean Intellectual Property Office, the disclosure of which is incorporated herein in its entirety by reference.

BACKGROUND

1. Field

Embodiments of the present invention relate generally to an image processing system and method, and more particularly to an image processing system and method that detects objects in real-time.

2. Description of the Related Art

Recently, research on an advanced drive assist system (ADAS) for safe driving has been actively conducted. Also, cameras of various purposes have been mounted on a vehicle. For example, a front camera for detecting lanes, vehicles, traffic signs, etc., a rear-view camera for assisting parking in backward direction, and a system such as an around view monitoring (AVM) system for recognizing circumstance around a vehicle have been widely mounted. However, such systems do not offer the detection of moving objects around the camera in real-time.

SUMMARY

This patent was supported by grant from the Civil-Military Cooperation Program "Multi-purpose Unmanned Ground Vehicle for Infantry (supervising agency: Hanwha Land Systems Co., Ltd.)"

Embodiments of the present invention include a method of detecting a moving object around a camera in real-time.

Additional aspects will be set forth in part in the description which follows and, in part, will be apparent from the description, or may be learned by practice of embodiments of the present invention.

According to embodiments of the present invention, a method of processing an image includes: constructing a plurality of grids on an image; extracting features of the image; estimating a grid motion vector of each of the plurality of grids, based on a first motion vector of each of the features; estimating a second motion vector of each feature based on the grid motion vector; and detecting a moving object based on a difference between the first motion vector and the second motion vector.

The estimating of the grid motion vector may include: propagating the motion vector of each feature to peripheral grids; estimating a first representative motion vector of each grid based on motion vectors accumulated in each grid; and estimating a second representative motion vector of each grid based on the first representative motion vectors of each grid and peripheral grids.

The estimating of the second motion vector may include estimating a second motion vector of each feature based on interpolation on the motion vector of each grid.

The detecting of the moving object may include: calculating a residual vector that is a difference between the first motion vector and the second motion vector of each feature; propagating the residual vector of each feature to peripheral grids; estimating a residual vector of each grid through a first filtering of the residual vectors accumulated in each grid and a secondary filtering of the residual vectors of each grid and peripheral grids of each grid; and detecting a set of grids satisfying a preset residual vector condition as a candidate moving object.

The detecting of the moving object may further include removing noise from the residual vector of each feature.

The detecting of the moving object may include: calculating a residual vector that is a difference between the first motion vector and the second motion vector of each feature; and detecting a set of peripheral pixels around a feature having a residual vector having a magnitude equal to or greater than a threshold magnitude as a candidate moving object.

The detecting of the moving object may further include removing noise from the residual vector of the feature.

The method may further include detecting a candidate moving object satisfying a preset condition from among at least one candidate moving object.

The method may further include determining that a device obtaining the image is in a stopped state in a case where a ratio of first motion vectors having magnitude equal to or greater than a threshold magnitude with respect to the extracted features is equal to or greater than a threshold number.

In embodiments of the present invention, an image processing device includes: a feature extractor configured to extract features of an image and to estimate a first motion vector of each of the features; a motion estimator configured to construct a plurality of grids on the image, to estimate a motion vector of each of the plurality of grids based on the first motion vector of each feature, and to estimate a second motion vector of each feature based on the motion vector of each grid; and a moving object detector configured to detect a moving object based on a difference between the first motion vector and the second motion vector.

The motion estimator may be configured to propagate the motion vector of each feature to peripheral grids, to estimate a first representative motion vector of each grid based on motion vectors accumulated in each grid, and to estimate a second representative motion vector of each grid based on first representative motion vectors of each grid and peripheral grids of each grid.

The motion estimator may be configured to estimate the second motion vector of each feature based on interpolation of the motion vector of each grid.

The moving object detector may be configured to calculate a residual vector that is a difference between the first motion vector and the second motion vector of each feature, to propagate the residual vector of each feature to peripheral grids, to estimate a residual vector of each grid through a first filtering of residual vectors accumulated in each grid and a secondary filtering of residual vectors of each grid and peripheral grids of each grid, and to detect a set of grids satisfying a preset residual vector condition as a candidate moving object.

The moving object detector may be configured to remove noise from the residual vector of each feature.

The moving object detector may be configured to detect a candidate moving object satisfying a preset condition from among at least one candidate moving object.

The image processing device may further include a state estimator configured to determine that a device obtaining the image is in a stopped state in a case where a ratio of first motion vectors having magnitude equal to or greater than a threshold magnitude with respect to the extracted features is equal to or greater than a threshold number.

BRIEF DESCRIPTION OF THE DRAWINGS

Other advantages of the present invention will be readily appreciated and better understood by referencing the following detailed description when considered in connection with the accompanying drawings wherein.

DETAILED DESCRIPTION

Figure 1:
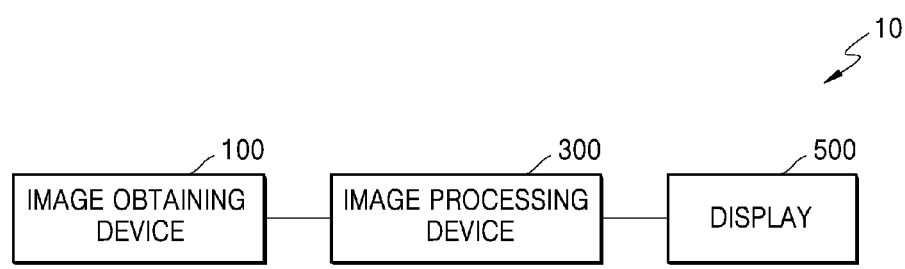
FIG. 1 is a schematic diagram of an image processing system according to an embodiment of the present invention.

Content provided hereinafter illustrates the principles of the present disclosure, though it should be noted that the present invention is not limited hereto. Therefore, one of ordinary skill in the art may embody the principles of the present disclosure, although not shown or described explicitly herein, and invent a variety of devices included in the spirit and scope of the present disclosure. In addition, all of the conditional terms and embodiments listed herein are, in principle, intended to make the concept of the present disclosure understood, and not limited to the particular embodiments and conditions listed herein. In addition, all the detailed descriptions listing particular embodiments, as well as the principles of the present disclosure, aspects and embodiments, are to be understood to intend to include structural and functional equivalents of such information. Also, it is understood that such equivalents include equivalents to be developed in the future, that is, all devices invented to perform the same function, as well as equivalents that are currently known.

Thus, functions of various elements shown in the drawings, including functional blocks labeled as a processor or a similar concept may be provided through use of hardware that has capability of executing software in association with appropriate software, as well as dedicated hardware. When provided by a processor, functions may be provided by a single dedicated processor, single shared processor, or a plurality of individual processors, some of which may be shared. Furthermore, a processor, control, or a term suggested as a similar concept thereof, although it is clearly used, should not be construed as exclusively citing hardware having the ability to execute software, but should be construed as implicitly including Digital Signal Processor (DSP) hardware, or ROM, RAM, or non-volatile memory for storing software without restriction. The processor, control, or term may also include known other hardware.

The above objects, characteristics, and merits will become more apparent from the following detailed description taken in conjunction with the accompanying drawings. In the description, certain detailed explanations of the related art are omitted when it is deemed that they may unnecessarily obscure the essence of the present disclosure.

Throughout the specification, when a portion "includes" an element, another element may be further included, rather than excluding the existence of the other element, unless otherwise described.

Hereinafter, embodiments of the present invention will be described in detail with reference to accompanying drawings.

FIG. 1 is a schematic diagram of an image processing system 10 according to an embodiment of the present invention.

The image processing system 10 according to an embodiment of the present invention may be embodied in a driving device or an automatic driving device (e.g., vehicles, robots, etc.) Hereinafter, an example in which the image processing system 10 is implemented in a vehicle will be described.

Referring to FIG. 1, the image processing system 10 may include an image obtaining device 100, an image processing device 300, and a display 500.

The image obtaining device 100 may be an image recognition device attached to a vehicle that is driving. For example, the image obtaining device 100 may be a camera obtaining surrounding images of the vehicle. The image obtaining device 100 may use a plurality of sensors independently, or one or more sensors may be used in combination. Alternatively, the image obtaining device 100 may use some sensors among a plurality of sensors independently and some sensors among a plurality of sensors in combination. The image obtaining device 100 may be installed, for example, on a front portion, a rear portion, or a side portion of a vehicle. However, it should be appreciated that the image obtaining device may be selectively installed at any appropriate location. The image obtaining device 100 may be applied to any type of vehicle. For example the image obtaining device 100 may be applied to vehicles including two-wheeled vehicles such as a motorbikes, four-wheeled vehicles such as a sedan or sport utility vehicle, a many-wheeled vehicle such a train or truck, or a vehicle that includes one or fewer wheels.

In another embodiment, the image obtaining device 100 may be a single fixed camera arranged at a certain fixed location and having a fixed photographing range, or a pan-tilt-zoom (PTZ) camera having panning/tilting/zooming functions.

The image processing device 300 may receive image input from the image obtaining device 100, and may detect a moving object based on a background motion of the image. The image processing device 300 may estimate a two-dimensional motion (e.g., background motion) of a remaining part except for the moving object, and may detect the moving object by comparing estimated background motion with feature point (feature) correspondence (e.g., pixel motion). The image processing device 300 may represent the detected moving object to be identifiable in the image.

The image processing device 300 may perform a signal processing. The signal processing may include converting an image signal to a signal suitable for the standard of the display 500 and outputting the converted signal. For example, the image processing device 300 may perform an image signal processing for improving image quality, e.g., gamma correction, color filter array interpolation, color matrix, color correction, color enhancement, etc.

The display 500 may provide an image output from the image processing device 300 to a user, and thus, the user may monitor the image displayed on the display 500. The display 500 may include a liquid crystal display (LCD) panel, an organic light-emitting display (OLED) panel, an electrophoretic display (EPD) panel, etc. The display 500 may include a touchscreen for receiving a user input through a touch operation, and may function as a user input interface.

The image processing device 300 and the display 500 may be installed in a vehicle. In an embodiment of the present invention, the image processing device 300 may be included in the image obtaining device 100. Alternatively, the image processing device 300 and the display 500 may be provided separately from the image obtaining device 100.

Figure 2:
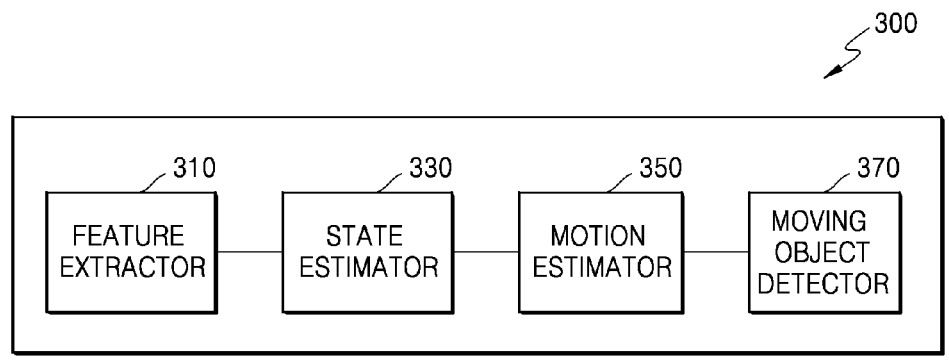
FIG. 2 is a schematic block diagram of the image processing device of FIG. 1.

FIG. 2 is a schematic block diagram of the image processing device 300 of FIG. 1.

Referring to FIG. 2, the image processing device 300 may include a feature extractor 310, a state estimator 330, a motion estimator 350, and a moving object detector 370.

The feature extractor 310 may extract one or more features from an image. The feature extractor 310 may extract features such as corners, edges, contours, line intersections, etc. from the image.

The feature extractor 310 extracts as much correspondence between features in the background as possible, and extracts correspondence between adjacent images as well. The feature extractor 310 traces a feature of a current image corresponding to a feature of a previous image, and may extract corresponding relationship between corresponding features of two images. The feature extractor 310 may generate a motion vector connecting corresponding features of two images through feature matching. A motion vector is motion information including outwardly shown sizes and directions of motions in two images taken at a different time. Hereinafter, a set of motion vectors of the features is referred to as a feature flow.

The feature extractor 310 may extract the feature correspondence by using fast feature detector and Pyramidal Kanade-Lucas-Tomassi (KLT) feature tracker. The feature extractor 310 may perform grid-based Homography-RANSAC filtering in order to remove inaccurate feature correspondence. However, embodiments of the present invention are not limited to the above feature extracting and matching algorithms, and may use various feature extracting and matching algorithms such as SIFT algorithm, HARRIS corner algorithm, SUSAN algorithm, etc.

Figure 3A:
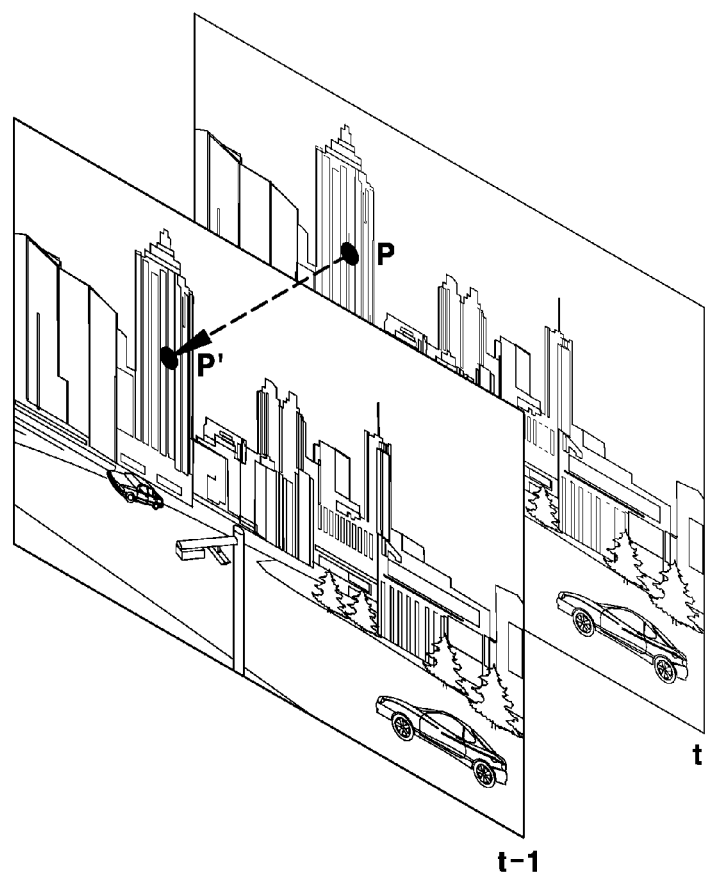
FIGS. 3A to 3C are diagrams showing examples of a feature matching according to an embodiment of the present invention.
Figure 3B:
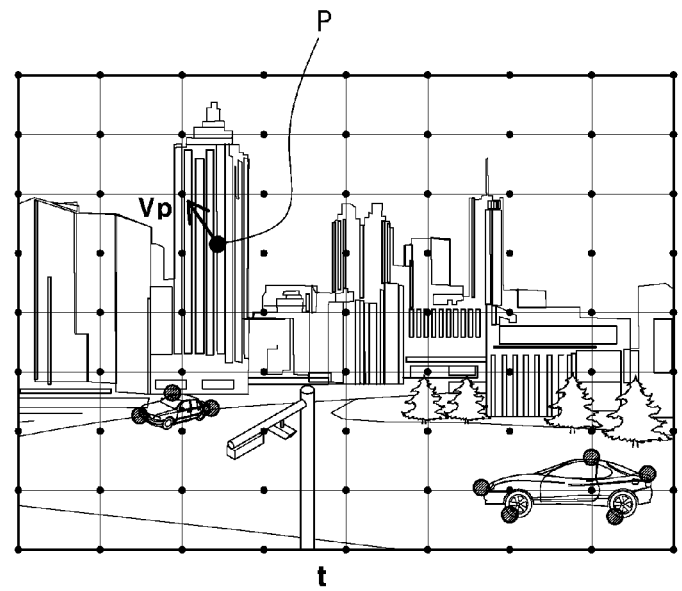
Figure 3C:
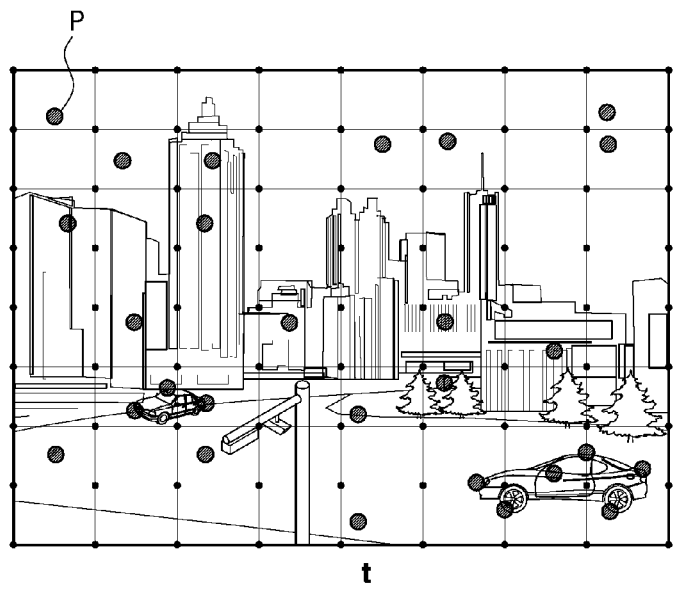

FIGS. 3A to 3C are diagrams showing examples of feature matching according to an embodiment of the present disclosure. As shown in FIG. 3A, the feature extractor 310 searches for a feature p of a current image t corresponding to a feature p' of a previous image t−1, and as shown in FIG. 3B, the feature extractor 310 may calculate a motion vector $v_p = p - p'$ at the feature p of the current image t. FIG. 3C shows a plurality of features p extracted from the current image t by the feature extractor 310. Each of the features includes motion information.

The state estimator 330 may estimate whether the image obtaining device 310 or a device in which the image obtaining device 310 is mounted (hereinafter, referred to as 'vehicle') is in a moving state or in a stopped state by using the feature correspondence. The state estimator 330 may identify a ratio r of the features, the magnitude of motion vector or moving amount (motion amount). The ratio r of the features is equal to a threshold moving amount THm or greater, with respect to total features extracted from the current image. When it is assumed that the total number of features is N, and the number of features having the moving amount equal to or greater than the threshold moving amount THm is a, the ratio r of the features may be expressed by equation (1) below.

$$r = \frac{a}{N - a} \quad (1)$$

When the feature correspondence ratio r is equal to or greater than a threshold ratio THr, the state estimator 330 may determine that the vehicle is in a stationary state. The state estimator 330 may initiate a feature extraction result when the vehicle is in the stationary state.

The motion estimator 350 may estimate a motion vector of a grid based on a motion vector of a feature (hereinafter, referred to as 'first motion vector').

The motion estimator 350 may construct mesh grids on an input image. The motion estimator 350 may construct M×N grids (where M and N are integers equal to or greater than one (1)) on the image. The motion estimator 350 may construct the grids before or after extracting the features.

The motion estimator 350 may propagate feature matching information (or feature correspondence information) estimated through the feature extraction, based on the grids. The motion estimator 350 may propagate feature correspondence information in a grid to peripheral grids adjacent to the grid within a predetermined region.

The motion estimator 350 may propagate or allocate a first motion vector of each feature to peripheral grids. The motion estimator 350 may allocate the first motion vector of each feature to vertexes of peripheral grids. The motion estimator 350 may allocate the first motion vector of a feature to vertexes of grids within a predetermined first region where the feature is included as a center. The first region may be set as any shape, such as a rectangle, a square, a circle, an oval, etc., and may cover the predetermined number of grids located upper, lower, left, and right sides of the grid including the feature. The vertex to which the motion vector is allocated is one of four vertexes of the grid, and the motion vector may be allocated to vertexes at identical locations in all of the grids.

Figure 4A:
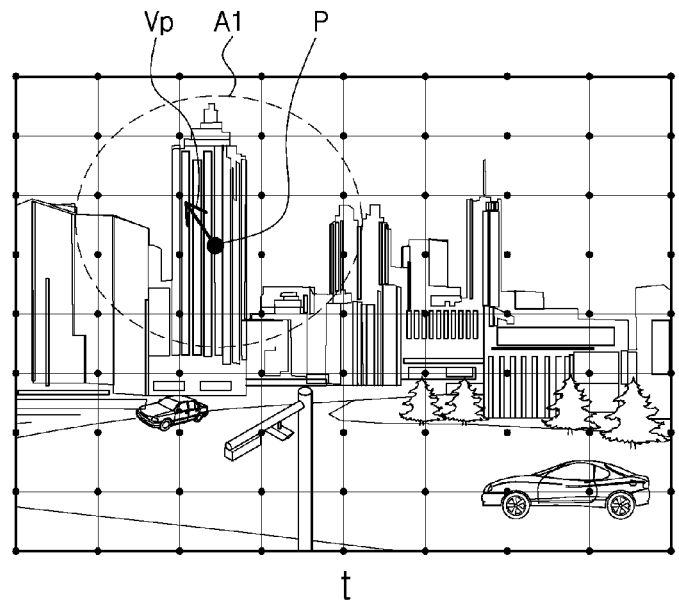
FIGS. 4A and 4B are diagrams illustrating propagation of a motion vector according to an embodiment of the present invention.
Figure 4B:
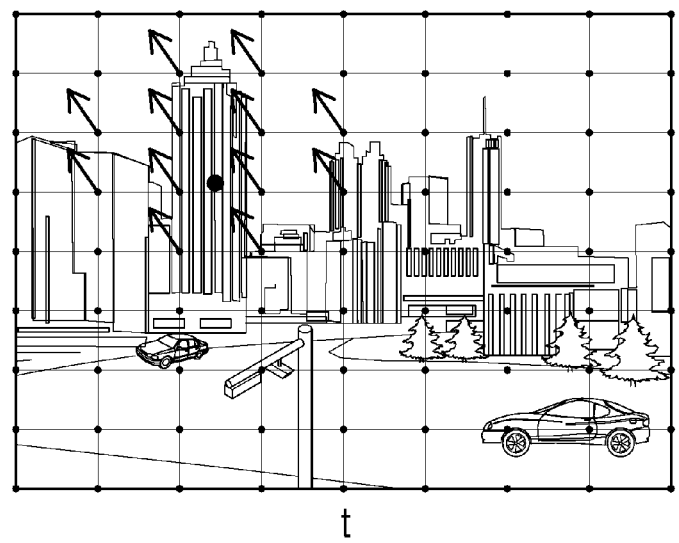

FIGS. 4A and 4B are diagrams illustrating propagation of a motion vector according to an embodiment of the present invention. As shown in FIG. 4A, a first area A1 of an oval shape is set around a grid, in which a feature p of the current image t is included at the center of the first area A1. As shown in FIG. 4B, a first motion vector $v_p$ of the feature p is allocated to lower right (or upper left) vertexes of twelve grids in the first area A1.

The motion estimator 350 may allocate first motion vector of each feature to the vertex of each of the peripheral grids, with respect to the entire features. Accordingly, at least one first motion vector is allocated to the vertex of each grid to have feature correspondence information of peripheral features. A set of motion vectors of the grids is referred to as a mesh flow.

The motion estimator 350 may perform a motion vector filtering in order to remove noise in the motion information accumulated in each grid and to reduce influence of a moving object on the mesh flow. That is, the mesh flow may be information obtained by effectively excluding the moving object and sparsely estimating motion in background.

The motion estimator 350 may filter the one or more first motion vectors allocated to one grid. The motion estimator 350 may select one first motion vector satisfying a preset condition, from among the one or more first motion vectors allocated to the grid, by using a first filter f1. The first motion vector allocated to each grid through the first filtering is referred to as a first representative motion vector.

The motion estimator 350 may select the most dominant first motion vector from among one or more first motion vectors allocated to the grids as the first representative motion vector. Here, the dominant first motion vector may be a motion vector having an intermediate value, the largest frequency, an average value, or a weighted average value, etc. The motion vector having an intermediate value may be a motion vector located intermediately when a plurality of motion vectors are listed in ascending order or descending order. The motion estimator 350 may remove noise in the motion information accumulated in the grids through the first filtering of the motion vector.

Figure 5:
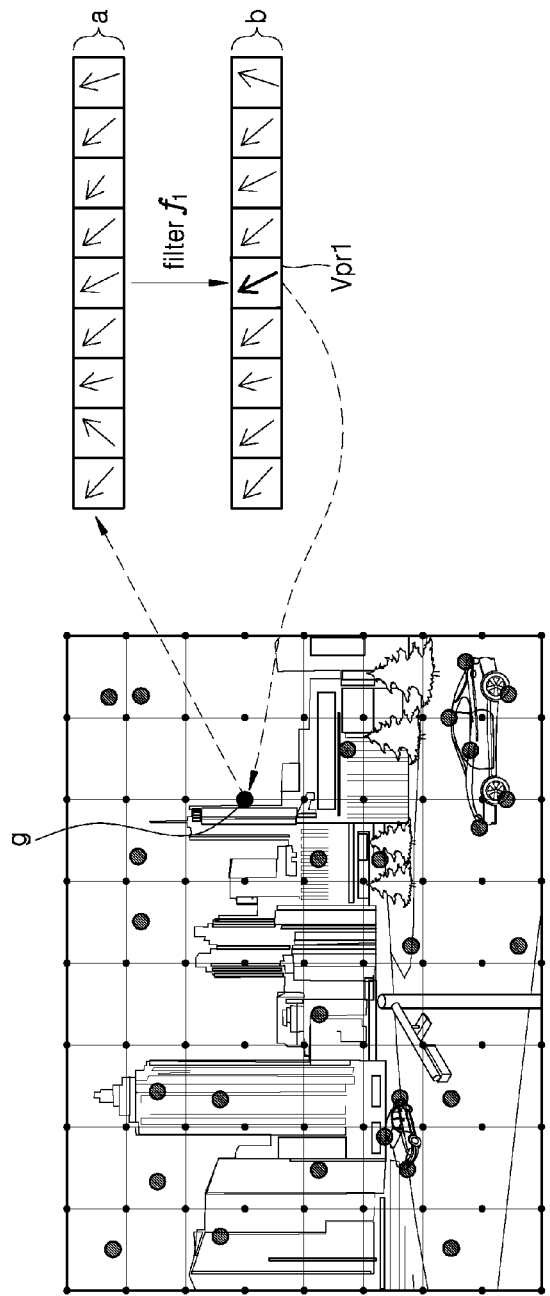
FIG. 5 is a diagram exemplarily illustrating a first filtering of a motion vector according to an embodiment of the present invention.

FIG. 5 is a diagram exemplarily illustrating a first filtering of the motion vector according to an embodiment of the present invention. Referring to FIG. 5, the motion estimator 350 may estimate a first representative motion vector $v_{pr1}$ of a grid by applying a first filter f1 to nine first motion vectors $v_p$ (a) accumulated at a vertex of the grid g. In the example of FIG. 5, the motion estimator 350 arranges the accumulated first motion vectors $v_p$ from left to right taking into account magnitudes and directions of the motion vectors (b), and selects the first motion vector having an intermediate value as the first representative motion vector $v_{pr1}$ of the grid.

The motion estimator 350 may filter the first motion vectors allocated to the plurality of grids. The motion estimator 350 may select one first representative motion vector satisfying a preset condition as a second representative motion vector, from among the first motion vectors (i.e., first representative motion vectors) allocated to grids in a predetermined second area by using a second filter f2.

The motion estimator 350 may set the predetermined second area around each grid to which the first representative motion vector is allocated. The second area may cover k×l grids (where k and l are integers equal to or greater than one (1)) around the corresponding grid. The motion estimator 350 may select the most dominant first representative motion vector as the second representative motion vector, from among the first representative motion vectors allocated to the corresponding grid and peripheral grids within the second area by using the second filter f2. Here, the dominant first representative motion vector may be a motion vector having an intermediate value, the largest frequency, an average value, or a weighted average value, etc. from among a plurality of first representative motion vectors. The second representative motion vector may be a motion vector of the grid. Since the motion estimator 350 extracts the most dominant motion within a predetermined area through a secondary filtering of the motion vectors, an influence of the moving object on the mesh flow may be reduced.

Figure 6:
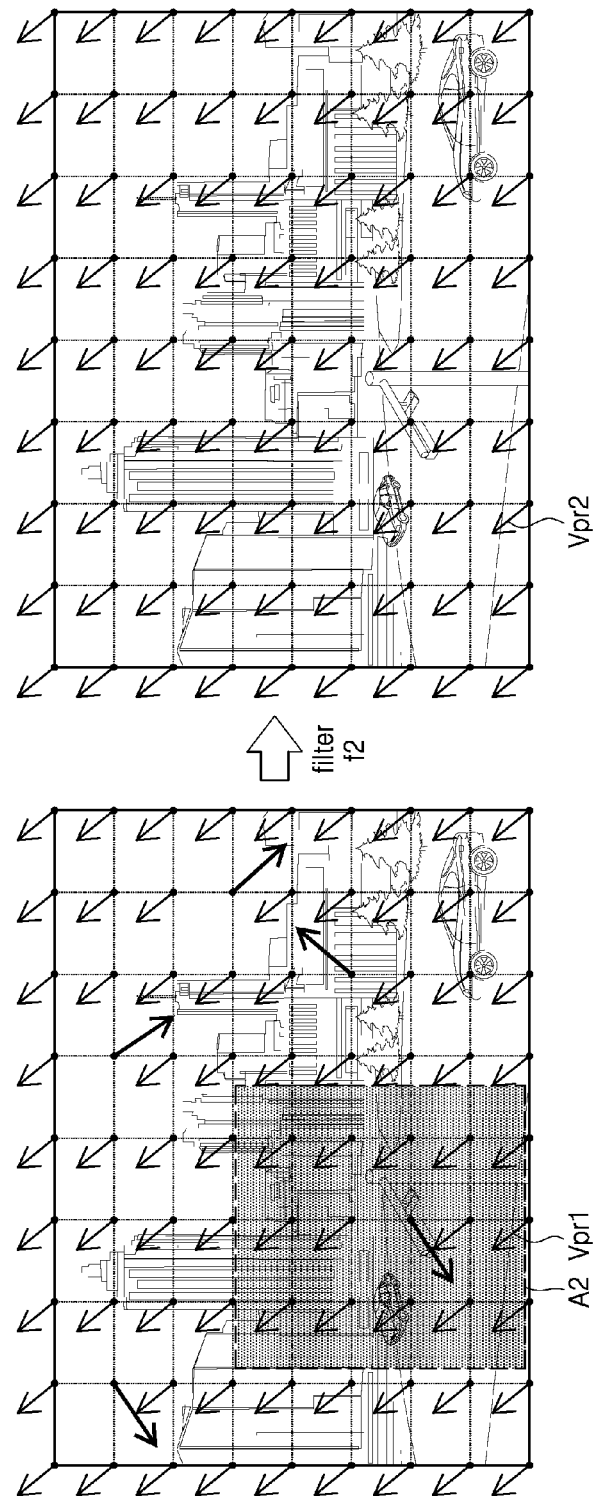
FIG. 6 is a diagram exemplarily illustrating a second filtering of a motion vector according to an embodiment of the present invention.

FIG. 6 is a diagram exemplarily illustrating a second filtering of the motion vector according to an embodiment of the present disclosure. Referring to FIG. 6, the motion estimator 350 may estimate a second representative motion vector $v_{pr2}$ by applying the second filter f2 to fifteen first representative motion vectors $v_{pr1}$ allocated to vertexes of grids within a second area A2. In the example of FIG. 6, the motion estimator 350 selects the second representative motion vector $v_{pr2}$ in a manner of allocating the most dominant first representative motion vector $v_{pr1}$ in the second area A2 to all grids in the second area A2.

The moving object detector 370 interpolates the motion vectors of a grid to estimate a motion vector at a feature (hereinafter, 'second motion vector'). A set of second motion vectors of the features is referred to as an interpolated mesh flow.

The moving object detector 370 calculates a residual vector that is a difference between the second motion vector and the first motion vector of a feature, and detects the moving object based on the residual vector. A set of residual vectors of the features is referred to as a residual flow. A residual flow R may be represented as a difference between a feature flow F and an interpolated mesh flow M' as expressed by equation (2) below. When the residual flow has a value exceeding a predetermined threshold, it may be determined as a moving object.

$$R = F - M' \qquad (2)$$

The moving object detector 370 may remove noise by emphasizing a differentiating residual vector after removing a residual vector having a large error (vector having noticeably low consistency), a residual vector having a small magnitude, etc. The moving object detector 370 may remove noise by applying a penalty function. Since the penalty function is a well-known calculation method, detailed descriptions thereof are omitted from the present disclosure.

Figure 7:
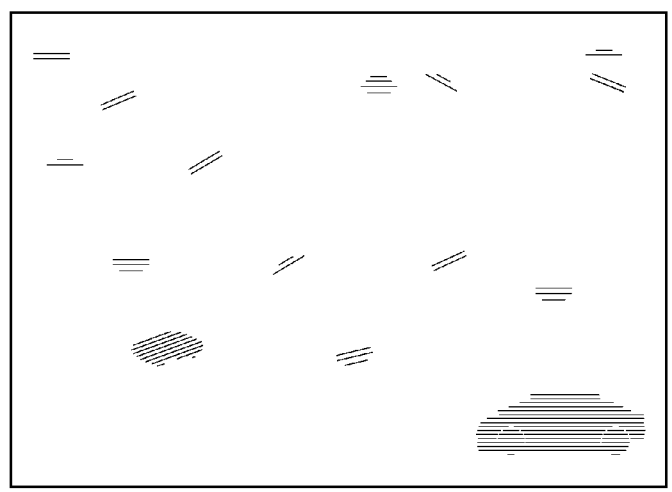
FIG. 7 is a diagram showing an example of a residual flow according to an embodiment of the present invention.

FIG. 7 is a diagram showing an example of a residual flow according to an embodiment of the present invention. FIG. 7 shows magnitudes of residual vectors. As shown in FIG. 7, the penalty function is applied to the residual flow, and then, a residual vector equal to or greater than a threshold value becomes having a greater value and a residual vector smaller than the threshold value becomes having a smaller value or is removed, so as to remove noise of the residual flow.

The moving object detector 370 may detect at least one candidate moving object based on the residual vectors.

According to an embodiment, the moving object detector 370 may detect the candidate moving object based on grids.

The moving object detector 370 may construct mesh grids on the residual flow. Sizes and the number of the mesh grids on the residual flow may be equal to or different from those of the mesh grids on the image by the motion estimator 350. For example, the mesh grids on the residual flow may be smaller in sizes or the number of mesh grids on the residual flow may be greater than that of the mesh grids on the image. The moving object detector 370 may construct M'×N' grids (M' and N' are integers equal to or greater than one (1)) on the residual flow.

The moving object detector 370 may propagate a residual vector of each feature to peripheral grids. The moving object detector 370 may allocate the residual vector of each feature to vertexes of the peripheral grids. The moving object detector 370 may allocate the residual vector of a feature to vertexes of the grids in a predetermined third area having the above feature as a center. The third area may be set as any shape, such as a rectangle, a square, a circle, an oval, etc., and the third area may cover the predetermined number of grids located at upper, lower, left, and right sides of the grid including the feature. The vertex to which the residual vector is allocated is one of four vertexes of the grid, and the residual vector may be allocated to vertexes at identical locations in all of the grids.

The moving object detector 370 may allocate the residual vectors of all features to the vertex of each of the peripheral grids. Accordingly, at least one residual vector may be allocated to the vertex of each grid.

The moving object detector 370 may remove noise by performing residual vector filtering.

The moving object detector 370 may filter one or more residual vectors allocated to one grid. The moving object detector 370 may primarily select one residual vector satisfying a preset condition, from among the one or more residual vectors allocated to the grid, by using a third filter f3. The moving object detector 370 may primarily select the most dominant residual vector from among the one or more residual vectors allocated to the grid. Here, the dominant residual vector may be a motion vector having an intermediate value, the largest frequency, an average value, or a weighted average value, etc. from among a plurality of residual vectors.

The moving object detector 370 may filter the residual vectors allocated to a plurality of grids. The moving object detector 370 may secondarily select one residual vector satisfying a preset condition, from among residual vectors allocated to grids in a predetermined fourth area, by using a fourth filter f4. The moving object detector 370 may set the predetermined fourth area based on each grid to which the primarily selected residual vector is allocated. The fourth area may cover k'×l' grids (where, k' and l' are integers equal to or greater than one (1)) around the corresponding grid. The moving object detector 370 may secondarily select the most dominant residual vector from among the residual vectors that are primarily selected and allocated to the corresponding grid and peripheral grids in the fourth area, by using the fourth filter f4. Here, the dominant residual vector may be a motion vector having an intermediate value, the largest frequency, an average value, or a weighted average value, etc. from among a plurality of residual vectors.

The moving object detector 370 may detect a set of grids satisfying the residual vector condition as a candidate moving object. The moving object detector 370 may perform clustering of grids including the residual vectors having magnitude equal to or greater than a threshold magnitude THs and spatially adjacent to one another.

Figure 8:
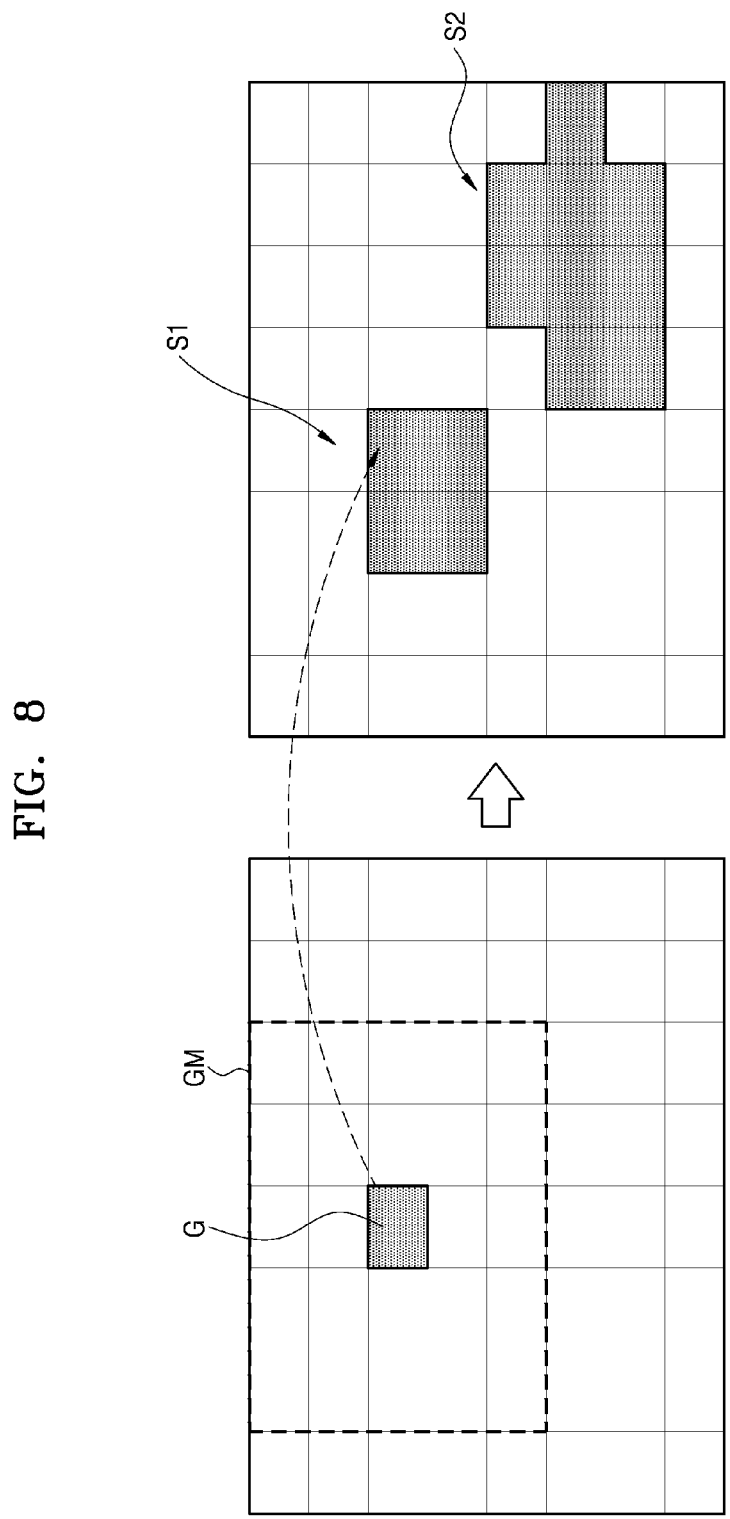
FIG. 8 is a diagram illustrating an example of detecting a moving object based on grids, according to an embodiment of the present invention.

FIG. 8 is a diagram illustrating an example of detecting a moving object based on grids, according to an embodiment of the present invention. FIG. 8 shows a part of an image.

The moving object detector 370, in each grid, may generate a histogram representing magnitude of residual vectors within a predetermined area GM around the corresponding grid G. The moving object detector 370 may select a grid, in which the number of residual vectors having magnitude equal to or greater than the threshold magnitude THs is equal to or greater than a threshold number THn, from the histogram of each grid. The moving object detector 370 may set grid sets S1 and S2 by clustering adjacent grids from among the selected grids. The moving object detector 370 may detect a rectangle including the grid set as a candidate moving object, and may represent the candidate moving object on the image.

According to an embodiment of the present invention, when detecting the candidate moving object based on the grids, a result of detecting the moving object, which is robust against environment change, may be provided because of the filtering, and thus, embodiments of the present invention may be used in detecting of moving object for an advanced drive assistant system (ADAS).

According to an embodiment of the present invention, the moving object detector 370 may detect the candidate moving object based on pixels.

Figure 9:
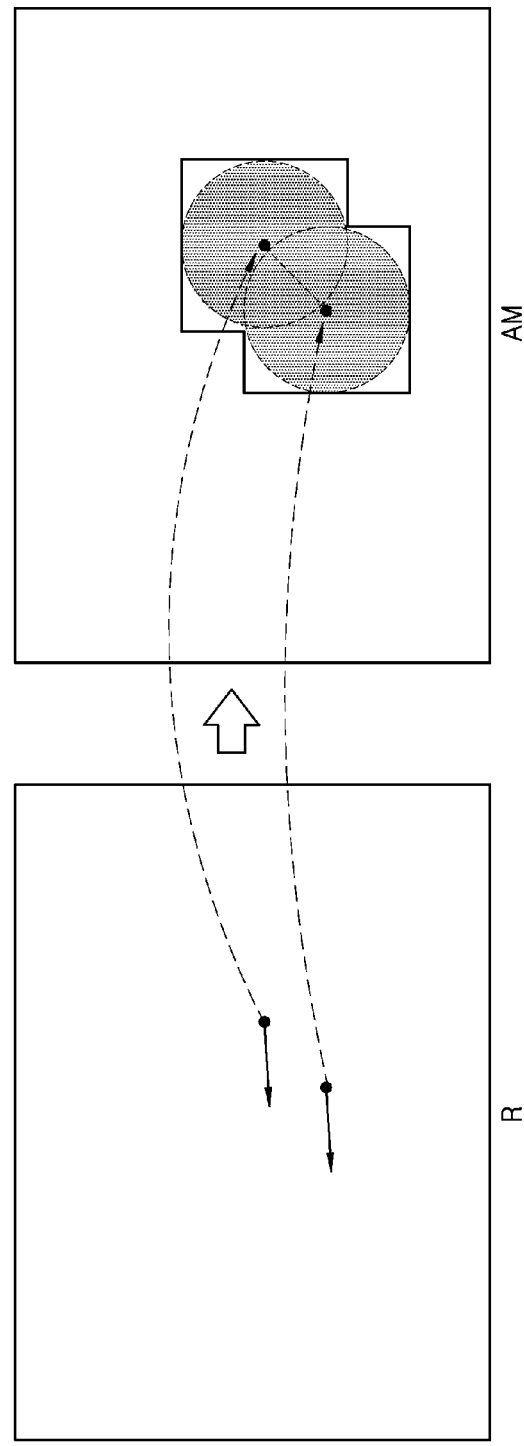
FIG. 9 is a diagram illustrating an example of detecting a moving object based on pixels, according to an embodiment of the present invention.

FIG. 9 is a diagram illustrating an example of detecting a moving object based on pixels, according to an embodiment of the present invention. FIG. 9 shows a part of an image.

The moving object detector 370 may generate an activation map AM. The activation map AM may be generated to have the same size as the image. The moving object detector 370 may select pixels within a predetermined radius from a location in the activation map AM, where the location corresponds to a location of the residual vector (i.e., feature of the residual vector) having magnitude equal to or greater than the threshold magnitude THs in the residual flow. The moving object detector 370 may perform a morphological operation on the selected pixels. The moving object detector 370 may represent a rectangle including a set of the selected pixels as a candidate moving object on the image.

According to an embodiment of the present invention, when detecting the candidate moving object based on pixels, the moving object is detected based on a location of the residual vector, and thus, a calculation amount and a calculation time are reduced and performance time period is shorter when compared to detecting the candidate moving object based on grids. Accordingly, the pixel-based candidate moving object detection is suitable for detecting of the moving object in real-time, and may be used in an intelligence surveillance system or a mobile platform.

According to embodiments of the present invention, an appropriate candidate moving object detection embodiment may be applied according to usage of an application in order to provide an optimal result of detecting the moving object.

The moving object detector 370 may filter at least one candidate moving object that is detected based on grids or based on pixels according to the usage of the application. At least one filtering condition may be set according to the usage of the application.

The filtering condition may include size, direction and velocity of the candidate moving object, detection continuity, a region of interest (ROI), etc. For example, size, moving direction, and velocity of a moving object shown under a certain circumstance may be used to calculate the threshold size, threshold moving direction, and threshold velocity of the candidate moving object. In order to reduce an influence of certain types of background motion such as trees moving regularly or light reflected by a river during driving of a vehicle, a frequency of successively detecting a moving object in areas that are temporally and spatially similar to each other may be applied as a threshold frequency for determining the detection continuity of the candidate moving object. Also, an inappropriate detection ratio may be reduced by restricting an area of detecting the moving object to the ROI.

In an embodiment of the present invention, the moving object detector 370 may filter the direction of the candidate moving object in order to detect a moving object approaching a vehicle at a low velocity (e.g., 30 km/h or less).

In another embodiment, the moving object detector 370 may split the image into a plurality of regions, and may filter the direction of the candidate moving object differently in each split region. The moving object detector 370 may filter the direction by setting an angle (θ).

Figure 10:
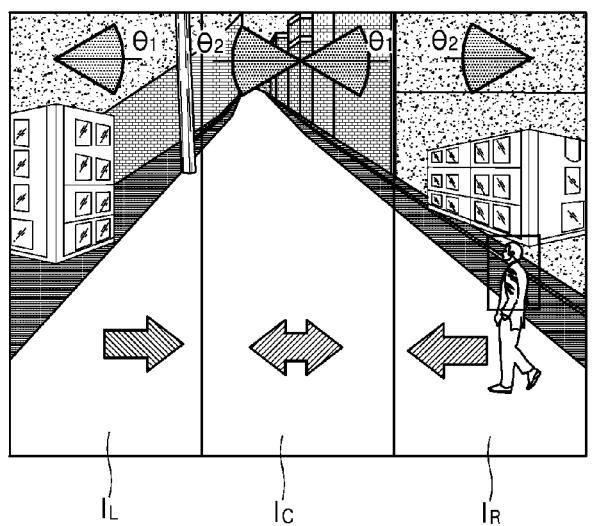
FIG. 10 is a diagram showing an example of a condition for filtering a candidate moving object according to an embodiment of the present invention.

FIG. 10 is a diagram showing an example of a condition for filtering the candidate moving object according to an embodiment of the present invention. As shown in FIG. 10, the moving object detector 370 may split the image into three regions, and may filter candidate moving objects having a direction within a range between an angle θ1 to an angle θ2 in a center region $I_C$ where a vehicle is moving, in order to detect a moving object away from the vehicle, that is, a moving object moving to left and right sides of the vehicle. In a right region $I_R$ of the vehicle, candidate moving objects having a direction within an angle of θ2 are filtered to detect a moving object approaching the vehicle. Similarly, in a left region $I_L$ of the vehicle, candidate moving objects having a direction within an angle of θ1 are filtered to detect a moving object approaching the vehicle.

Figure 11:
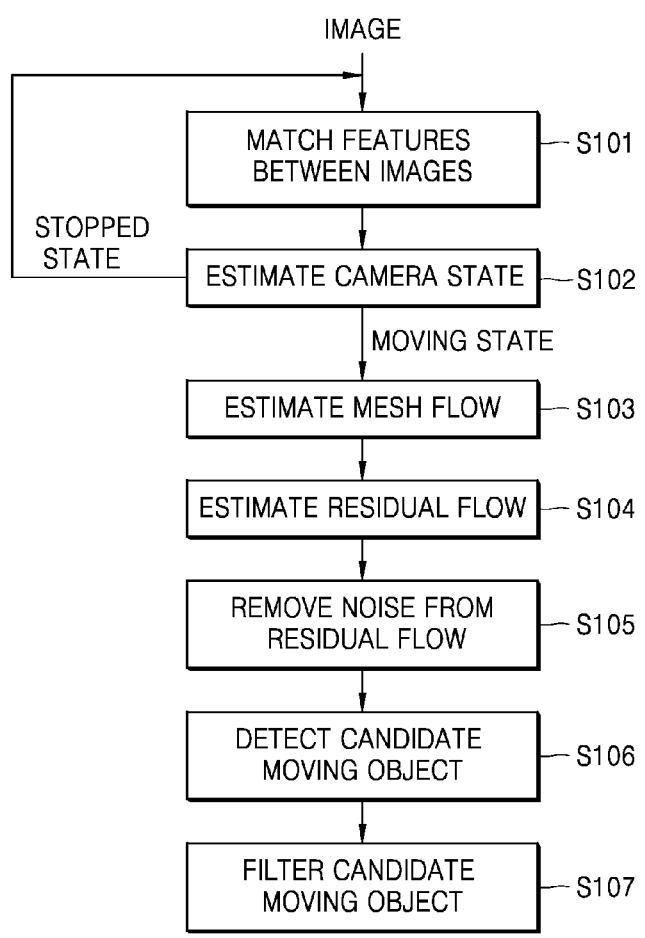
FIG. 11 is a flowchart schematically illustrating a moving object detecting method according to an embodiment of the present invention.

FIG. 11 is a flowchart schematically illustrating a moving object detecting method according to an embodiment of the present invention. The moving object detecting method illustrated in FIG. 11 may be performed by the image processing device 300 of FIG. 2. Hereinafter, descriptions about the elements described above with reference to FIGS. 1 to 10 will be omitted.

Referring to FIG. 11, an image processing device 300 may extract features from a current image that is input. The image processing device 300 may extract corresponding pairs of features through a feature matching between an adjacent image (i.e., a previous image) and the current image, and may estimate feature correspondence (S101). The image processing device 300 may estimate a motion vector (first motion vector) that is correspondence information between the feature pairs in the current image. The correspondence information is motion information of the feature.

The image processing device 300 may estimate a state of the vehicle, for example, whether a camera included in the vehicle is in a moving state or a stationary state, by using the feature correspondence (S102). The image processing device 300 may determine that the camera is in the stationary state, when a feature corresponding ratio r, that is, a ratio of features having motion vectors of threshold moving amount THm or greater with respect to entire features, is equal to or greater than a threshold ratio THr.

If the camera is in the stationary state, the image processing device 300 may return to the process of extracting features from a newly input image without performing a post process for detecting moving objects.

Figure 12:
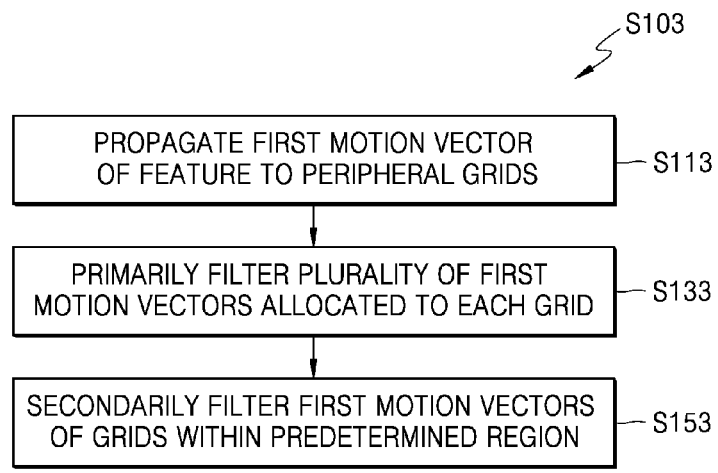
FIG. 12 is a flowchart schematically illustrating a method of estimating a mesh flow.

If the camera is in the moving state, the image processing device 300 may estimate a mesh flow that is a motion of a mesh grid, that is, a background motion (S103). FIG. 12 is a schematic flowchart of a method of estimating the mesh flow.

Referring to FIG. 12, the image processing device 300 constructs mesh grids on the image, and may propagate the first motion vector of the feature to peripheral grids (S113). The image processing device 300 may allocate the first motion vector of a feature to vertexes of grids within an area having the feature as a center.

The image processing device 300 may allocate a first representative motion vector to each grid by primarily filtering one or more first motion vectors allocated to each grid (S133). The image processing device 300 may primarily filter a first motion vector satisfying a preset condition as a first representative motion vector, from among a plurality of first motion vectors accumulated in one grid.

The image processing device 300 may secondarily filter first motion vectors of grids within a predetermined area to allocate a second representative motion vector to each grid (S153). The image processing device 300 may secondarily filter first motion vectors (that is, first representative motion vectors) of the grids within a predetermined area having a grid as a center, to allocate a second representative motion vector to the corresponding grid. The image processing device 300 may secondarily filter a first representative motion vector satisfying a preset condition as the second representative motion vector, from among the first representative motion vectors of the grids within the predetermined area.

The image processing device 300 may set the second representative motion vector as a motion vector of a grid, and may estimate a mesh flow that is a set of motion vectors of the grids.

Figure 13:
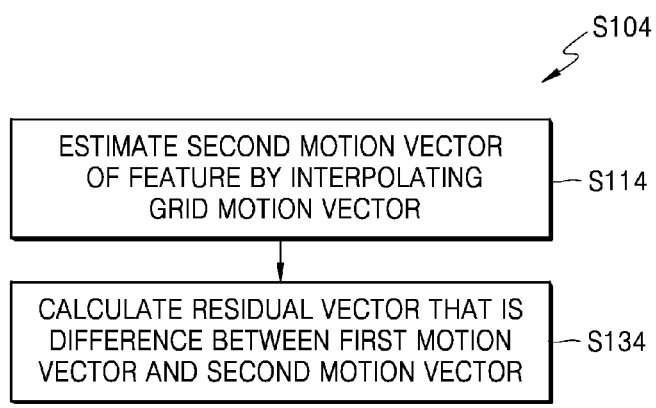
FIG. 13 is a flowchart schematically illustrating a method of estimating a residual flow.

The image processing device 300 may estimate a residual flow from the mesh flow (S104). FIG. 13 is a flowchart schematically illustrating a method of estimating a residual flow.

Referring to FIG. 13, the image processing device 300 may estimate a motion vector (second motion vector) at a location of a feature by interpolating the motion vector of the grid (S114).

The image processing device 300 may estimate the residual flow that is a set of residual vectors of the features by calculating a residual vector that is a difference between a second motion vector and a first motion vector at a location of a feature (S134).

The image processing device 300 may emphasize a differentiating residual vector by removing noise in the residual flow (S105). The image processing device 300 may remove noise by applying a penalty function.

The image processing device 300 may detect a candidate moving object from the residual flow (S106).

Figure 14:
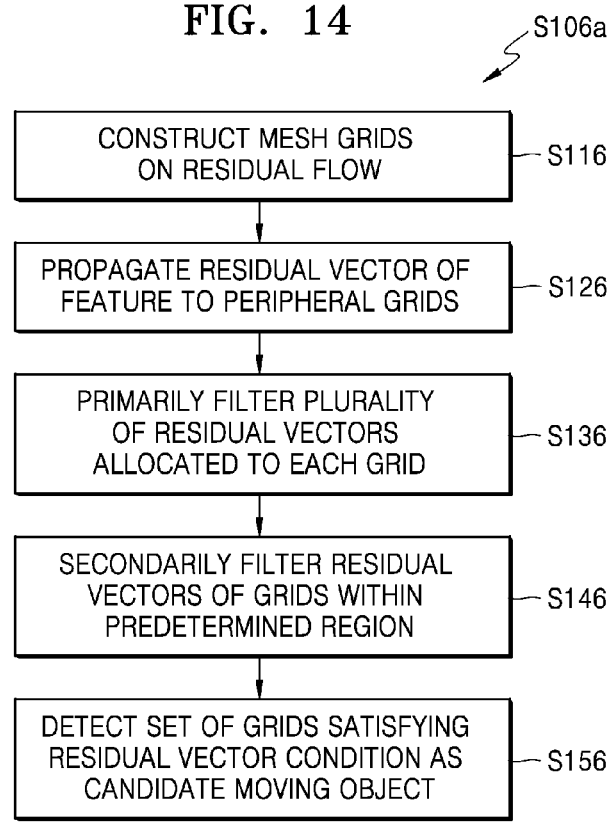
FIG. 14 is a flowchart schematically illustrating a method of detecting a candidate moving object based on grids, according to an embodiment of the present invention.

FIG. 14 is a flowchart schematically illustrating a method of detecting a candidate moving object based on grids (S106*a*) according to an embodiment of the present disclosure.

Referring to FIG. 14, the image processing device 300 may construct mesh grids on the residual flow (S116).

The image processing device 300 may propagate each residual vector to peripheral grids (S126). The image processing device 300 may allocate a residual vector of a feature to vertexes of grids within a predetermined area having the feature as a center.

The image processing device 300 may select and allocate one residual vector to each grid by primarily filtering one or more residual vectors allocated to each grid (S136).

The image processing device 300 may select and allocate one residual vector to each grid by secondarily filtering residual vectors of grids in a predetermined area (S146).

The image processing device 300 may detect a set of grids satisfying the condition about the residual vector as the candidate moving object (S156). The image processing device 300 selects a grid, and may detect a set of selected grids as a candidate moving object, where the grid satisfies the condition that the number of residual vectors having a magnitude equal to or greater than the threshold magnitude THs is equal to or greater than the threshold number THn within a predetermined area having that grid as a center.

Figure 15:
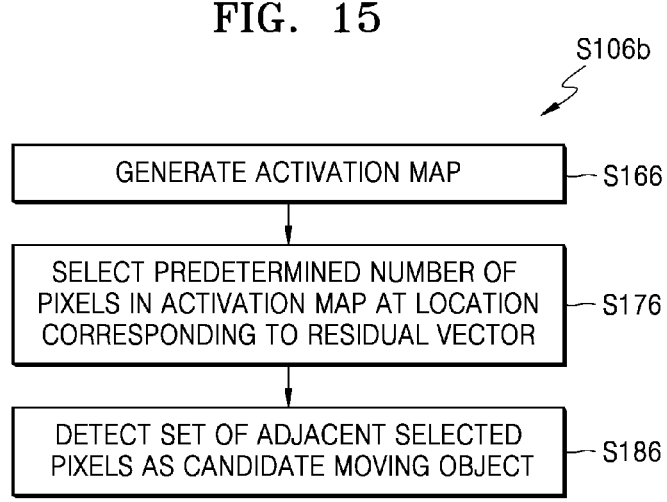
FIG. 15 is a flowchart schematically illustrating a method of detecting a candidate moving object based on pixels, according to an embodiment of the present invention.

FIG. 15 is a flowchart schematically illustrating a method of detecting a candidate moving object based on pixels (S106b) according to an embodiment of the present invention.

Referring to FIG. 15, the image processing device 300 may generate an activation map of a size equal to that of the image (S166).

The image processing device 300 may select pixels within a predetermined radius from a location in the activation map, where the location corresponds to a residual vector having a magnitude equal to or greater than the threshold magnitude THs in the residual flow (S176).

The image processing device 300 may detect a set of pixels that is obtained by connecting selected adjacent pixels (S186).

The image processing device 300 may filter at least one detected candidate moving object according to usage of an application (S107).

Detection of a moving object through learning is mainly used in a case where there are restricted kinds of moving objects, and a moving object is detected after learning characteristics of an object to be detected based on a database including a large amount of objects. Accordingly, in such a case many database documents are necessary to improve detecting performance, and thus, it is not suitable for detecting unspecified objects.

A method of detecting a moving object based on optical flow segmentation is a method of determining a segmented region having a different optical flow from peripheral regions as a moving object. When utilizing a method of detecting a moving object based on an optical flow segmentation use an optical flow extraction method and an image split method having high complexity and requiring a long execution time period in order to accurately detect an object. Accordingly, the above method is not suitable for a real-time application due to its complexity.

According to embodiments of the present invention, a moving object is detected based on a difference between background information estimated using a mesh flow by a mobile camera and a pixel flow. Therefore, according to embodiments of the present invention, a calculation amount and a calculation time period may be reduced when comparing with an optical flow extraction method.

A method of detecting the moving object according to the embodiments of the present invention may be applied to detect a moving object approaching a vehicle that is in a moving state at a low velocity in an advanced drive assist system (ADAS). Also, a method of detecting the moving object according to the embodiments of the present invention may be applied to detect a moving object having a different motion from that of a camera in an intelligent monitoring system.

A method of detecting the moving object according to the embodiments of the present Invention may be applied to an image that is obtained in a case where a camera moves (camera movement due to external environment or camera panning/tilting movement) by the camera fixed at a location, as well as an image that is obtained when a camera provided in a moving device moves according to the movement of the moving device.

A moving object detection method according to the present disclosure may be implemented as computer-readable codes in a computer-readable recording medium. The computer readable recording medium may be any data storage device that may store programs or data which may be thereafter read by a computer system. Examples of the computer readable recording medium include read-only memory (ROM), random-access memory (RAM), CD-ROMs, magnetic tapes, floppy disks, optical data storage devices, and so on. The computer readable recording medium may also be distributed over network coupled computer systems so that the computer readable code is stored and executed in a distributive manner. Also, functional programs, codes, and code segments for accomplishing the present disclosure may be easily construed by programmers skilled in the art to which the present disclosure pertains.

According to embodiments of the present invention, a result of detecting a moving object around a moving camera may be provided in real-time. Also, according to embodiments of the present invention, a result of detecting a moving object robust against motion noise may be provided.

Accordingly, embodiments of the present invention in their broadest aspect provide a result of detecting a moving object around a moving camera in real-time with a reduced calculation amount, a reduced calculation time, and reduced performance time period. Also, the embodiments of the present invention provide a result of detecting a moving object robust against motion noise.

It should be understood that embodiments described herein should be considered in a descriptive sense only and not for purposes of limitation. Descriptions of features or aspects within each embodiment should typically be considered as available for other similar features or aspects in other embodiments.

While one or more embodiments have been described with reference to the figures, it will be understood by those of ordinary skill in the art that various changes in form and details may be made therein without departing from the spirit and scope of the inventive concept as defined by the following claims.

What is claimed is:

1. A method of processing an image, the method comprising:
constructing a plurality of grids on an image;
extracting one or more features of the image;
estimating a grid motion vector of each of the plurality of grids, based on a first motion vector of each feature of the one or more features;
estimating a second motion vector of each feature of the one or more features based on the grid motion vector; and
detecting a moving object based on a difference between the first motion vector and the second motion vector,
wherein the estimating the first motion vector comprises:
propagating the first motion vector of each feature of the one or more features to a plurality of peripheral grids;
estimating a first representative motion vector of each grid based on the first motion vector of each feature of the one or more features accumulated in each grid, and
estimating a second representative motion vector of each grid based on the first representative motion vector of each grid and respective peripheral grids of each grid, as the grid motion vector.

2. The method of claim 1, wherein the estimating the second motion vector comprises estimating the second motion vector of each feature of the one or more features based on interpolation on the grid motion vector of each grid.

3. The method of claim 1, wherein the detecting the moving object comprises:
calculating a first residual vector that is the difference between the first motion vector and the second motion vector of each feature of the one or more features;

propagating the first residual vector of each feature of the one or more features to peripheral grids;

estimating a second residual vector of each grid through a first filtering of the first residual vector of each feature accumulated in each grid and a secondary filtering of the first residual vector of each feature of each grid and the peripheral grids of each grid; and detecting a set of grids satisfying a preset residual vector condition as a candidate moving object.

4. The method of claim 3, wherein the detecting the moving object further comprises removing noise from the first residual vector of each feature of the one or more features.

5. The method of claim 3, further comprising detecting a candidate moving object satisfying a preset condition from among at least one candidate moving object.

6. The method of claim 1, wherein the detecting the moving object comprises:

calculating a first residual vector that is the difference between the first motion vector and the second motion vector of each feature of the one or more features; and detecting a set of peripheral pixels around a feature of the one or more features having a feature residual vector having a magnitude equal to or greater than a threshold magnitude as a candidate moving object.

7. The method of claim 6, wherein the detecting the moving object further comprises removing noise from the feature residual vector of the feature of the one or more features.

8. The method of claim 6, further comprising detecting a candidate moving object satisfying a preset condition from among at least one candidate moving object.

9. The method of claim 1, further comprising determining that a device obtaining the image is in a stopped state in a case where a ratio of first motion vectors having magnitude equal to or greater than a threshold magnitude with respect to the extracted one or more features is equal to or greater than a threshold number.

10. An image processing device comprising:

a feature extractor configured to extract one or more features of an image and to estimate a first motion vector of each feature of the one or more features;

a motion estimator configured to construct a plurality of grids on the image, to estimate a motion vector of each of the plurality of grids based on the first motion vector of each of the one or more features, and to estimate a second motion vector of each feature of the one or more features based on the motion vector of each grid; and a moving object detector configured to detect a moving object based on a difference between the first motion vector and the second motion vector, wherein the motion estimator is further configured to propagate the first motion vector of each feature of the one or more features to peripheral grids, to estimate a first representative motion vector of each grid based on first motion vector of each feature of the one or more features accumulated in each grid, and to estimate a second representative motion vector of each grid based on the first representative motion vector of each grid and respective peripheral grids of each grid, as a grid motion vector.

11. The image processing device of claim 10, wherein the motion estimator is configured to estimate the second motion vector of each feature of the one or more features based on interpolation of the grid motion vector of each grid.

12. The image processing device of claim 10, wherein the moving object detector is configured to calculate a first residual vector that is the difference between the first motion vector and the second motion vector of each feature of the one or more features, to propagate the first residual vector of each feature of the one or more features to peripheral grids, to estimate a second residual vector of each grid through a first filtering of the first residual vector of each feature accumulated in each grid and a secondary filtering of residual vectors of each grid and the peripheral grids of each grid, and to detect a set of grids satisfying a preset residual vector condition as a candidate moving object.

13. The image processing device of claim 12, wherein the moving object detector is configured to remove noise from the first residual vector of each feature of the one or more features.

14. The image processing device of claim 12, wherein the moving object detector is configured to detect a candidate moving object satisfying a preset condition from among at least one candidate moving object.

15. The image processing device of claim 10, wherein the moving object detector is configured to calculate a first residual vector representing the difference between the first motion vector and the second motion vector of each feature of the one or more features, and to detect a set of peripheral pixels of a feature having a feature residual vector of a magnitude equal to or greater than a threshold magnitude as a candidate moving object.

16. The image processing device of claim 15, wherein the moving object detector is configured to remove noise from the first residual vector of each feature of the one or more features.

17. The image processing device of claim 15, wherein the moving object detector is configured to detect a candidate moving object satisfying a preset condition from among at least one candidate moving object.

18. The image processing device of claim 10, further comprising:

a state estimator configured to determine that a device obtaining the image is in a stopped state in a case where a ratio of first motion vectors having magnitude equal to or greater than a threshold magnitude with respect to the extracted one or more features is equal to or greater than a threshold number.

* * * * *